US007599536B2

(12) United States Patent
Kraus et al.

(10) Patent No.: US 7,599,536 B2
(45) Date of Patent: Oct. 6, 2009

(54) OPTIMIZING IMAGE SIGNAL INTERPRETATION FOR ANALOG IMAGE SIGNALS FROM MEDICAL IMAGE RECORDING DEVICES

(75) Inventors: Florian Kraus, Haar (DE); Christian Maier, Munich (DE); Manfred Weiser, Munich (DE)

(73) Assignee: BrainLAB AG, Feldkirchen (DE)

( * ) Notice: Subject to any disclaimer, the term of this patent is extended or adjusted under 35 U.S.C. 154(b) by 737 days.

(21) Appl. No.: 11/194,506

(22) Filed: Aug. 1, 2005

(65) Prior Publication Data
US 2006/0023926 A1  Feb. 2, 2006

Related U.S. Application Data

(60) Provisional application No. 60/606,008, filed on Aug. 31, 2004.

(30) Foreign Application Priority Data
Jul. 30, 2004 (EP) ................... 04018173

(51) Int. Cl.
*G06K 9/00* (2006.01)
(52) U.S. Cl. ................. 382/128; 382/132; 128/922
(58) Field of Classification Search ................. 382/128, 382/132; 128/922
See application file for complete search history.

(56) References Cited

U.S. PATENT DOCUMENTS 5,642,239 A  6/1997  Nagai 6,942,618 B2 *  9/2005  Simopoulos ............... 600/437
2002/0176541 A1  11/2002  Schubert et al.
2002/0183619 A1  12/2002  Hayasaka
2002/0196974 A1 *  12/2002  Qi et al. ..................... 382/170
2004/0101180 A1  5/2004  Doi et al.

FOREIGN PATENT DOCUMENTS

DE  1 260 179 A1  11/2002

OTHER PUBLICATIONS

European Search Report for corresponding Application No. 04018173.7 dated Dec. 16, 2004.

* cited by examiner

*Primary Examiner*—Brian P Werner
*Assistant Examiner*—Katrina Fujita
(74) *Attorney, Agent, or Firm*—Renner, Otto, Boisselle & Sklar, LLP

(57) ABSTRACT

A method for optimizing the interpretation of analog image signals or sequences of image signals output by medical image recording devices. The correlation of consecutively recorded image signals is tested and, based on the test, the image signals are identified as depicting the same or different images. More specifically, if the correlation is not less than a particular threshold value, it is established that the image signals depict the same image. If the correlation is less than a particular threshold value, it is established that the image signals possibly depict different images. Further, the threshold value is dynamically adjusted if the correlation has changed.

12 Claims, 2 Drawing Sheets

OPTIMIZING IMAGE SIGNAL INTERPRETATION FOR ANALOG IMAGE SIGNALS FROM MEDICAL IMAGE RECORDING DEVICES

RELATED APPLICATION DATA

This application claims priority of U.S. Provisional Application No. 60/606,008 filed on Aug. 31, 2004, which is incorporated herein by reference in its entirety.

FIELD OF THE INVENTION

The invention relates to a method for optimizing the interpretation of analog image signals or sequences of image signals output by medical image recording devices.

BACKGROUND OF THE INVENTION

In the field of x-ray image-assisted, image-guided surgery a physician works with the aid of a navigation system that provides information on the inner body structure of a patient with the aid of intraoperatively produced x-ray images. In such image guided surgery, it is important to precisely identify the moment at which a new image is recorded by the x-ray apparatus. The navigation system has to "know" the moment when the x-ray apparatus recorded a particular x-ray image in order to correctly assign said x-ray image information to corresponding patient position/location data detected by the navigation system.

When using analog x-ray apparatus and/or C-arc x-ray apparatus, the time the image was produced conventionally is detected with the aid of certain hardware components. For example, an x-ray detector can be attached to the image intensifier of a C-arc x-ray apparatus. Whenever an image is acquired, the detector is exposed to x-ray radiation and the corresponding time can be detected. In other conventional systems, a light detector can be attached to the control lamp of the C-arm, and the light detector is activated when an image is acquired. Both methods are hardware-assisted methods that require additional detectors to be attached to the x-ray apparatus. This increases susceptibility to errors and also increases the apparatus hardware.

SUMMARY OF THE INVENTION

The present invention provides a method for optimizing the interpretation of analog image signals or sequences of image signals output by medical image recording devices, such as x-ray apparatus, that overcomes one or more of the disadvantages discussed above. In particular, the invention enables one to ascertain the moment when a new image signal is detected without additional or dedicated hardware. Further, the invention enables the type and properties of new images to be interpreted.

The advantages that may be achieved in accordance with the invention are based on performing a method for optimizing the interpretation of analog image signals or sequences of image signals output by medical image recording devices, such as an x-ray apparatus. The method comprises the steps of testing the correlation of consecutively recorded image signals; establishing that the image signal depict the same image if the correlation is not less than a particular threshold value; establishing that the image signals possibly depict different images if the correlation is less than a particular threshold value; and dynamically adjusting the threshold value if the correlation has changed (the threshold can be adjusted based on the current signal-to-noise ratio, for example).

In other words, the present invention enables one to move away from using hardware to detect the moment a new image is produced. More specifically, the present invention can interpret the image signal and deduce from the contents of the image signal or sequence of image signals whether a new image has been produced. This is advantageous in that less hardware is required to operate the system. Further, in interpreting the detected image signals, additional information can be obtained that can be used during surgery.

As will be discussed below, the threshold value preferably is dynamically adjusted. If the threshold value were not adjusted, instances could arise where a new recorded image that does not change over a certain period of time, constantly lies below the threshold value due to an increased proportion of noise, thus affecting the correlation of the image data and the position data. A system that does not adapt the threshold value would constantly output a signal indicating new images are being detected. By adapting the threshold value, this source of error can be eliminated.

In a preferred embodiment, the threshold value can be set higher as the signal-to-noise ratio is increased and lower as the signal-to-noise ratio is decreased. In this case, or also in general terms, the threshold value can be set such that a correlation gap between the image signal and the threshold value is kept constant.

As already mentioned above, constantly analyzing the image contents allows more than just establishing whether a new image is pending at the image receiver of an analog x-ray apparatus. It also enables the identification of whether or not only particular recording parameters have changed or whether the end of a long-term x-ray recording has been reached.

Based on this knowledge, the present invention provides a method in which a certain number of consecutive image signals below the threshold value are evaluated when different images are depicted, and the standard deviation of these signals can be determined and compared with a pre-set value, whereupon:

c1a) if the number of changed image signals in succession is at least equal to a predetermined sample number and the standard deviation is lower than the pre-set value, it can be established that the correlation deviation has been caused by changes in the manner of recording the same image, in particular by changes in contrast or brightness; and c1b) the threshold value is re-set lower; or c2a) if the number of changed image signals in succession is at least equal to a predetermined sample number and the standard deviation is higher than the pre-set value, it can be established that the correlation deviation has been caused by continuously detecting images from different and changing recording situations, in particular by continuously recording during a relative movement between the recording apparatus and the recorded object;

c2b) the threshold value is not re-set; or c3) if the number of changed image signals in succession is less than a predetermined sample number, an image signal from the consecutive image signals can be classified as a new image.

In accordance with the invention, all possible situations may be detected or interpreted from the acquired image signals, and navigation then can be performed proceeding from and based on a correct image interpretation.

In one embodiment, when image signals are classified as a new image, the time the new image was produced can be detected. This time can be relayed to a further processing system, in particular a medical navigation system, which can process the image information, assign it to current patient location data, and output the information for image-assisted medical treatment.

In accordance with another embodiment, an additional threshold value can be determined which lies between the correlation value of the signal and the threshold value, and image signals between the threshold value and the additional threshold value can be classified as outliers and not taken into account when dynamically setting the threshold value.

The invention further relates to a program which, when it is running on a computer or is loaded onto a computer, causes the computer to perform a method as described above. The invention further relates to a computer program storage medium comprising a program as defined above.

DETAILED DESCRIPTION

Figure 1:
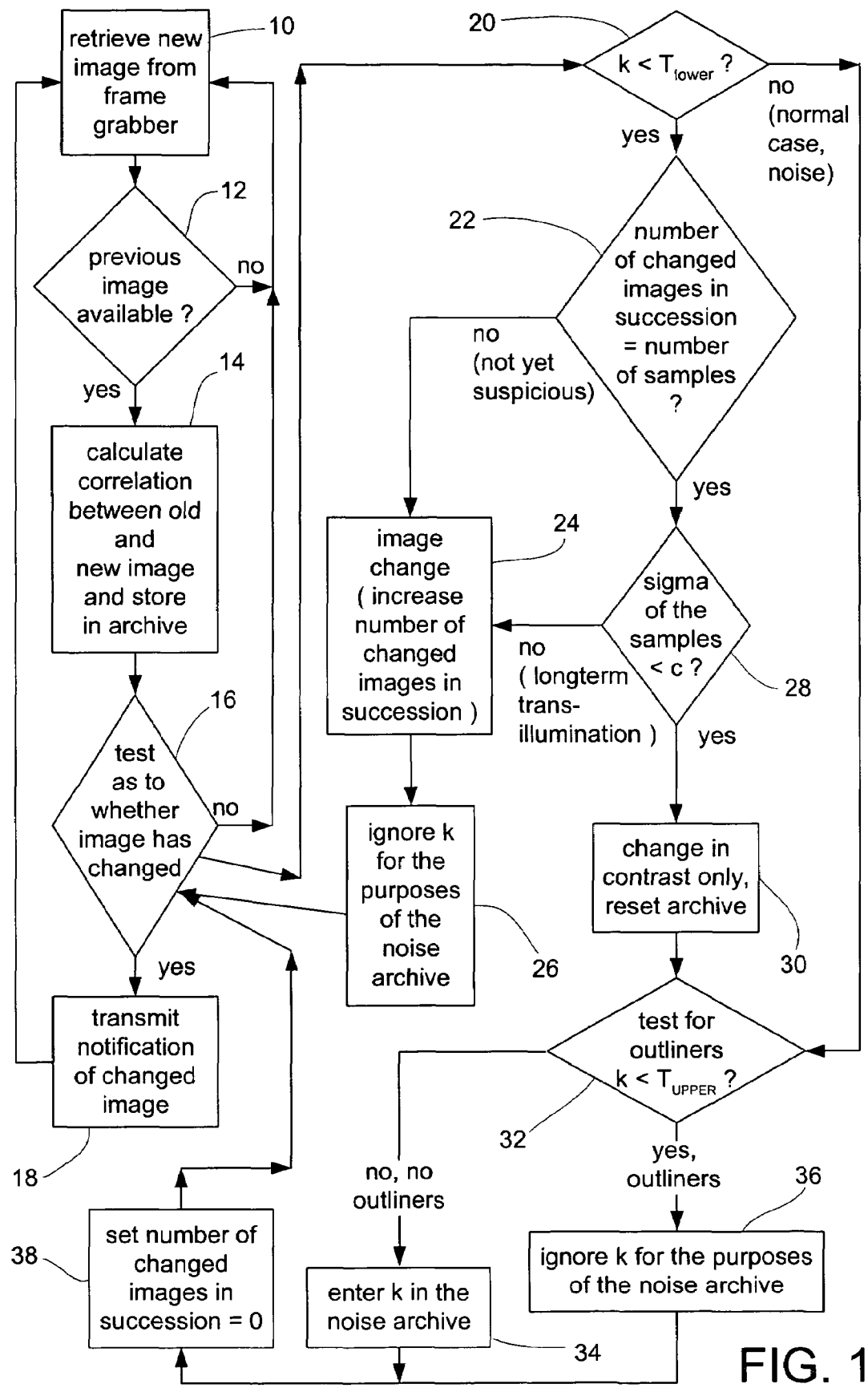
FIG. 1 is a flow diagram for carrying out a method in accordance with the present invention.

The invention will now be described with reference to the drawings. It is noted that the features of the invention can be implemented individually or in any combination. Further, the invention can be used with various medical image recording devices, including, for example, computer or nuclear spin tomographs or the like. As used herein, the term "adjust(ing) the threshold value" refers to setting, resetting, adapting, changing, etc., the threshold value based on certain criteria.

In general terms, the invention can be classified as an evaluation of an auto-correlation value for a medical imaging system (e.g., a C-arc x-ray apparatus) video output signal. More specifically, the auto-correlation value or correlation is calculated by comparing sequential frames of the video signal, wherein the correlation range is less than or equal to 1.0 (perfect correlation, no changes between sequential frames) and greater than or equal to −1.0 (no correlation between sequential frames). Due to signal noise, the correlation generally will be at a value less than −1.0, which shall be referred to in the following as n.

When an individual new image is acquired, the correlation value drops from n to a smaller value, which is referred to in the following as s, and then rises again, for example, back to n. In order to detect this acquisition of an individual image, a threshold value is set which is referred to in the following as $T_{lower}$. This threshold value lies between n and s. When the correlation value falls below the threshold $T_{lower}$, a new image is detected. In addition, the gap between n and $T_{lower}$ is kept constant.

This enables the threshold value $T_{lower}$ to be dynamically adjusted in order to take into account long-term changes in the noise level which can arise due to changes in the video signal quality or the contrast of the C-arc image. This also enables changes in contrast and long-term image detection to be distinguished, as long as the noise level of an image having a changed contrast does not fall below the threshold value $T_{lower}$. In order to take this instance into account, the number of consecutive frames below the threshold value $T_{lower}$ is counted. When a predetermined number of consecutive frames are below the threshold, the standard deviation "sigma" of the correlation value in each case is calculated and compared with a pre-set value or limit value c. This limit value or pre-set value c serves to distinguish between a change in contrast (with a low standard deviation of the correlation values) and constant or long-term image detection (with a high standard deviation of the correlation values). If sigma is less than c, the change in the noise level is regarded as a change in the contrast of the image. The threshold value $T_{lower}$ then is adjusted to the current correlation value, wherein the gap between the image signal and a correlation of 1.0 (perfect correlation) is multiplied by a constant factor greater than 1, and the result is used as an adjusted gap for the new threshold. If sigma is greater than c, the change in the noise level is regarded as a result of long-term recording and the threshold value $T_{lower}$ is not adjusted.

Furthermore, a second threshold value $T_{upper}$ also can be introduced, which lies between $T_{lower}$ and n. This threshold value $T_{upper}$ serves to distinguish outliers in the correlation values, which are generated by momentary disruptions in the video signal, from actual image detection signals. All values between $T_{lower}$ and $T_{upper}$ are qualified as outliers and are not taken into account when dynamically setting the threshold value $T_{lower}$.

In the following, the procedure is explained again more precisely on the basis of the enclosed flow diagram in FIG. 1. The following abbreviations are used in this diagram:

k: correlation values (k=1.0 signifies identical images)
$T_{lower}$: lower threshold value, determines a new image
$T_{upper}$: upper threshold value, determines outliers
sigma: standard deviation of sequential correlation values
c: limit/pre-set value for sigma The flow diagram represents the situation during the acquisition of new images. The explanation begins with step 10 wherein a new image (e.g., from the image intensifier of a C-arc x-ray apparatus) is retrieved from the frame grabber. Next at step 12, a determination is made as to whether a previous image is available. If a previous image is not available, then the procedure moves back to step 10 and a new image again is retrieved from the frame grabber. If, however, a previous image is available, then at step 14 the correlation between the old image and the new image is calculated and stored in an archive. At step 16, a test is performed to determine whether the image has changed. If the image has not changed, the procedure moves back to step 10 and a new image again is retrieved from the frame grabber. If the image has changed, then at step 18 a report or notification is generated that can be relayed to a further processing system, such as a medical navigation system or the like, which processes the image information, assigns the image information to current patient location data, and outputs the image information for image-assisted medical treatment.

The test performed at step 16 is shown in steps 20-38 of FIG. 1. Beginning at step 20, it is determined whether the current correlation value k is less than the threshold value $T_{lower}$. If k is less than $T_{lower}$, the number of changed images in succession is compared with a pre-set sample number. If this pre-set sample number has not yet been reached, it may be assumed that no extraordinary circumstances have occurred and that the image has simply changed and the procedure moves to step 24. At step 24, the number of changed images in succession is increased, and at step 26 the value k for the detected correlation is ignored for the purposes of the noise archive. The method returns to the step which tests whether the image has changed (step 16), wherein this question is answered with a 'yes'.

If at step 22 the question as to whether the sample number has been reached is to be answered with a 'yes', then at step 28 the standard deviation sigma of the samples is determined and compared with a pre-set value c. If the standard deviation is lower than c, then at step 30 it may be assumed that it is not a new image but rather that there has merely been a change in the type of image detection, e.g., a change in contrast. The archive is reset, and the method switches to the outlier test at step 32 described below.

If, however, it is established that the standard deviation is greater than the pre-set value c, it may be assumed that it is an image from a number of images produced during a long-term transillumination. It is then established at step 24 that the image has changed and the number of changed images in succession is increased. At step 26 the value k is ignored for the purposes of the noise archive, and the test as to whether the image has changed (step 16) is given the answer 'yes'.

If k is not less than $T_{lower}$, it is assumed that this is the normal case having a certain noise level, and the procedure moves to step 32, which establishes whether an outlier is present in the signal. The test at step 32 establishes whether the correlation value k is less than the threshold value $T_{upper}$. If k is not less than $T_{upper}$, then at step 34 the value for k is not an outlier and is entered in the noise archive. At step 38 the number of changed images in succession is zeroed, and the question as to whether the image has changed (step 16) is answered with a 'no'. If the value for k is less than $T_{upper}$, then at step 36 the value for k is qualified as an outlier and is entered in the noise archive. At step 38 the number of changed images in succession is zeroed, and the question as to whether the image has changed (step 16) is answered with a 'no'. The method then returns again to the step in which a new image is retrieved from the frame grabber.

Figure 2:
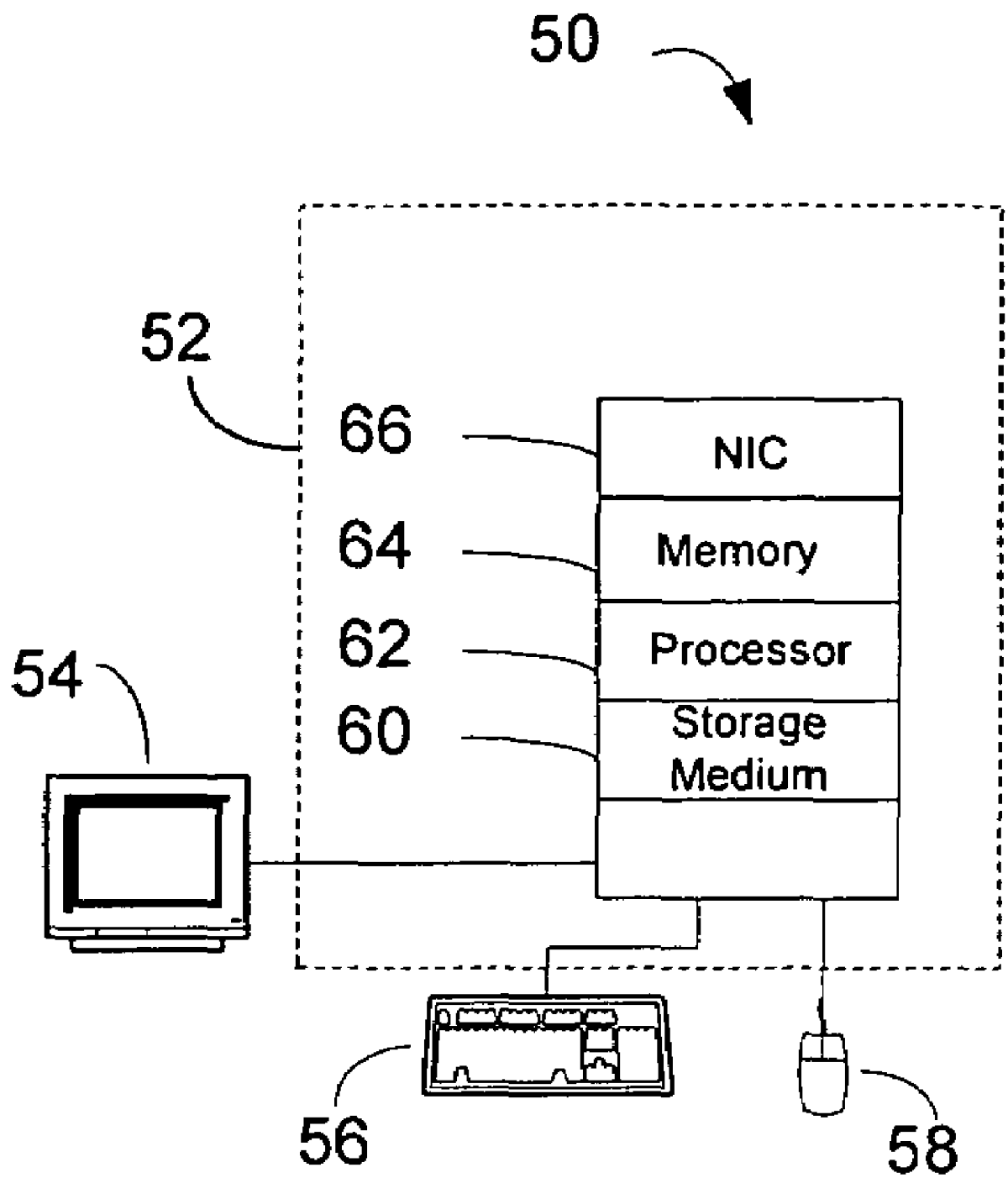
FIG. 2 is a block diagram of a computer system that can be used to implement the method of the present invention.

Moving to FIG. 2, a computer system 50 for executing a computer program in accordance with the present invention is illustrated. The computer system 50 includes a computer 52 for processing data, and a display 54 (e.g., a Cathode Ray Tube, Liquid Crystal Display, or the like) for viewing system information. A keyboard 56 and pointing device 58 may be used for data entry, data display, screen navigation, etc. The keyboard 56 and pointing device 58 may be separate from the computer 52 or they may be integral to it. A computer mouse or other device that points to or otherwise identifies a location, action, etc., e.g., by a point and click method or some other method, are examples of a pointing device. Alternatively, a touch screen (not shown) may be used in place of the keyboard 56 and pointing device 58. Touch screens may be beneficial when the available space for a keyboard 56 and/or a pointing device 58 is limited.

Included in the computer 52 is a storage medium 60 for storing information, such as application data, screen information, programs, etc. The storage medium 60 may be a hard drive, an optical drive, or the like. A processor 62, such as an AMD Athion 64™ processor or an Intel Pentium IV®, processor, combined with a memory 64 and the storage medium 60 execute programs to perform various functions, such as data entry, numerical calculations, screen display, system setup, etc. A network interface card (NIC) 66 allows the computer 52 to communicate with devices external to the computer system 50.

The actual code for performing the functions described herein can be readily programmed by a person having ordinary skill in the art of computer programming in any of a number of conventional programming languages based on the disclosure herein. Consequently, further detail as to the particular code itself has been omitted for sake of brevity.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for optimizing the interpretation of analog image signals or sequences of image signals output by medical image recording devices, comprising the steps of:
   a) testing the correlation of consecutively recorded image signals;
   b) establishing that the image signals depict the same image if the correlation is not less than a particular threshold value;
   c) establishing that the image signals possibly depict different images if the correlation is less than the particular threshold value; and
   d) dynamically adjusting the threshold value if the correlation has changed
   wherein when it is established that different images are depicted, a certain number of consecutive image signals below the threshold value are evaluated, and a standard deviation of the image signals is determined and compared with a pre-set value, wherein:
   c1a) if the number of changed image signals in succession is at least equal to a predetermined sample number and the standard deviation is lower than the pre-set value, it is established that the correlation deviation has been caused by changes in the manner of recording the same image; and
   c1b) the threshold value is adjusted lower;
   or
   c2a) if the number of changed image signals in succession is at least equal to the predetermined sample number and the standard deviation is higher than the pre-set value, it is established that the correlation deviation has been caused by continuously detecting images from different and changing recording situations;
   c2b) the threshold value is not adjusted;
   or
   c3) if the number of changed image signals in succession is less than the predetermined sample number, an image signal from the consecutive image signals is classified as a new image.

2. The method as set forth in claim 1, wherein the threshold is dynamically adjusted based on a current signal-to-noise ratio.

3. The method as set forth in claim 1, wherein the medical image recording device is a x-ray apparatus.

4. The method as set forth in claim 1, wherein the threshold value is increased with an increasing signal-to-noise ratio and decreased with a decreasing signal-to-noise ratio.

5. The method as set forth in claim 1, wherein the threshold value is adjusted by multiplying a gap between the image signal and a perfect correlation of 1.0 by a constant factor greater than 1 to obtain a result, and then using the result as an adjusted gap for the new threshold.

6. The method as set forth in claim 1, wherein changes to the manner of recording the same image includes changes to contrast or brightness.

7. The method as set forth in claim 1, wherein continuously detecting images from different and changing recording situations includes continuously recording during a relative movement between the recording apparatus and the recorded object.

8. The method as set forth in claim 1, wherein when image signals are classified as a new image, the time the new image was produced is detected.

9. The method as set forth in claim 8, wherein the time the new image was produced is relayed to a further processing system which processes the image information, assigns the image information to current patient location data and outputs the image information for image-assisted medical treatment.

10. The method as set forth in claim 9, wherein the processing system is a medical navigation system.

11. The method as set forth in claim 1, wherein an additional threshold value is determined which lies between the correlation value of the signal and the threshold value, and wherein image signal values between the threshold value and the additional threshold value are classified as outliers and are not taken into account when dynamically adjusting the threshold value.

12. A computer readable medium comprising computer executable instructions adapted to perform the method in accordance with claim 1.

* * * * *